United States Patent
Lee et al.

(10) Patent No.: US 8,588,755 B2
(45) Date of Patent: Nov. 19, 2013

(54) METHOD FOR PROVIDING SUPPLEMENTARY SERVICE CONTROL MENU AND SYSTEM TO PROVIDE THE SUPPLEMENTARY SERVICE CONTROL MENU

(71) Applicant: Pantech Co., Ltd., Seoul (KR)

(72) Inventors: Eunseong Lee, Seoul (KR); Kyung Bang Lee, Seoul (KR)

(73) Assignee: Pantech Co., Ltd., Seoul (KR)

( * ) Notice: Subject to any disclaimer, the term of this patent is extended or adjusted under 35 U.S.C. 154(b) by 0 days.

(21) Appl. No.: 13/676,214

(22) Filed: Nov. 14, 2012

(65) Prior Publication Data

US 2013/0072176 A1    Mar. 21, 2013

Related U.S. Application Data

(63) Continuation of application No. 12/816,688, filed on Jun. 16, 2010, now Pat. No. 8,331,920.

(30) Foreign Application Priority Data

Jul. 20, 2009  (KR) .................. 10-2009-0065796

(51) Int. Cl.
*H04M 3/00*       (2006.01)

(52) U.S. Cl.
USPC ........... 455/418; 455/566; 455/558; 715/825; 715/808

(58) Field of Classification Search
None
See application file for complete search history.

(56) References Cited

U.S. PATENT DOCUMENTS

2006/0082802 A1   4/2006   Furuya
2006/0143098 A1   6/2006   Lazaridis
2006/0172734 A1   8/2006   Tak
2009/0131022 A1 * 5/2009   Buckley et al. ............ 455/412.1
2009/0311991 A1 * 12/2009  Shin ............................ 455/411

FOREIGN PATENT DOCUMENTS

KR       1020060088266        8/2006

OTHER PUBLICATIONS

Non-Final Office Action dated Nov. 30, 2011 in U.S. Appl. No. 12/816,688.
Final Office Action dated Apr. 13, 2012 in U.S. Appl. No. 12/816,688.
Notice of Allowance dated Aug. 9, 2012 in U.S. Appl. No. 12/816,688.

* cited by examiner

*Primary Examiner* — Marcos Batista
*Assistant Examiner* — Keith Fang
(74) *Attorney, Agent, or Firm* — H.C. Park & Associates, PLC

(57) ABSTRACT

A system to provide a supplementary service control menu includes an information collection unit to collect state information associated with a supplementary service; a level determination unit to determine a level of the supplementary service using the state information; a menu building unit to generate an identifier (ID) of the supplementary service and to build the supplementary service control menu; and a menu display unit to display the built supplementary service control menu including the supplementary service having an effect associated with the level on a screen. A method for providing the supplementary service control menu includes collecting state information associated with a supplementary service; determining a level of the supplementary service; generating an ID of the supplementary service; building the supplementary service control menu including the generated ID; and displaying the supplementary service control menu including the supplementary service having an effect associated with the level.

22 Claims, 10 Drawing Sheets

FIG. 4

| SUPPLEMENTARY SERVICE | STATE INFORMATION | | |
|---|---|---|---|
| | SUBSCRIPTION INFORMATION | ACTIVATION INFORMATION | COMPATIBILITY INFORMATION |
| CFU | SUBSCRIPTION | DEACTIVATED | COMPATIBLE |
| CFB | SUBSCRIPTION | ACTIVATED | - |
| CFNRy | SUBSCRIPTION | DEACTIVATED | COMPATIBLE |
| CFNRc | SUBSCRIPTION | DEACTIVATED | COMPATIBLE |
| BAOC | SUBSCRIPTION | DEACTIVATED | INCOMPATIBLE |
| BAOIC | SUBSCRIPTION | DEACTIVATED | INCOMPATIBLE |
| BAOIC exHC | SUBSCRIPTION | DEACTIVATED | INCOMPATIBLE |
| MSP | NON-SUBSCRIPTION | - | - |
| MC | NON-SUBSCRIPTION | - | - |

FIG. 5

| SUPPLEMENTARY SERVICE | LEVEL | EFFECT |
|---|---|---|
| CFU | 3 | PALE BLUE |
| CFB | 1 | BLUE |
| CFNRy | 3 | PALE BLUE |
| CFNRc | 3 | PALE BLUE |
| BAOC | 4 | GRAY |
| BAOIC | 4 | GRAY |
| BAOIC exHC | 4 | GRAY |
| MSP | 2 | BLACK |
| MC | 2 | BLACK |

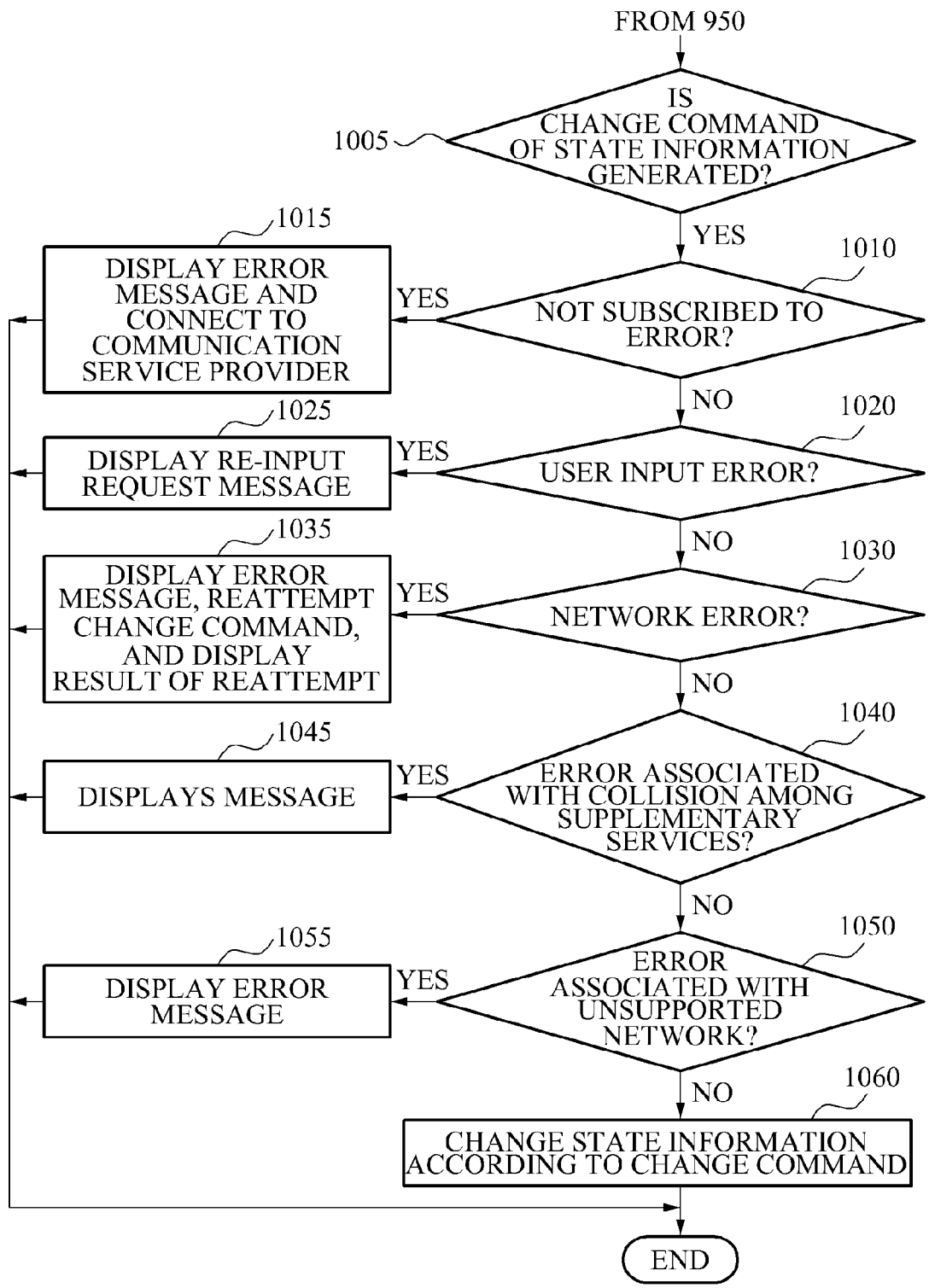

METHOD FOR PROVIDING SUPPLEMENTARY SERVICE CONTROL MENU AND SYSTEM TO PROVIDE THE SUPPLEMENTARY SERVICE CONTROL MENU

CROSS-REFERENCE TO RELATED APPLICATION

The present application is a continuation of U.S. patent application Ser. No. 12/816,688, filed on Jun. 16, 2010, and claims priority from and benefit of Korean Patent Application No. 10-2009-0065796, filed on Jul. 20, 2009, which is hereby incorporated by reference for all purposes as if fully set forth herein.

BACKGROUND

1. Field of the Disclosure

The present disclosure relates to a method for providing a supplementary service control menu that may provide information for use of a supplementary service in a mobile terminal, and a system to provide a supplementary service control menu.

2. Discussion of the Background

Due to the development of communication technologies, a mobile communication terminal may provide a variety of functions such as voice/video call, a Short Message Service (SMS), an email, wireless Internet, a Digital Multimedia Broadcasting (DMB), and the like.

Also, various supplementary services using a mobile communication network are currently provided.

For example, a supplementary service (SS) registered as a standard may include eMLPP, Call Deflection SS (CD), Number Identification SS (CLIP, CLIR, CoLP, CoLR), Call Offering SS (CFU, CFB, CFNRy, CFNRc), Call Completion SS (CW, HOLD), Multi Party SS (MPTY), Community of Interest SS (CUG), User-to-User SS (UUS), Charging SS (AoCI, AoCC), Call Restriction SS (BAOC, BOIC, BOIC-exHC, BAIC, BAIC-Roam), Call Transfer SS (ECT), Completion of Calls to Busy Subscribers (CCBS SS, CCBS Requests), Name Identification SS (CNAP), Multicall (MC), Follow Me (FM) Service, and the like.

Also, a technology of displaying related information on a screen to enable a user to check a state of a supplementary service which the user has subscribed to has been provided.

Korean Patent Publication No. 10-2006-0088266, entitled 'Apparatus and method for displaying the status of supplementary service of mobile terminal equipment', discloses a method of simultaneously displaying activation status of a plurality of supplementary services that a user has subscribed to on a screen.

FIG. 1 illustrates an example of a screen displaying a status of a supplementary service of a mobile terminal in a conventional art.

As illustrated in FIG. 1, information about whether a user subscribes to a supplementary service and information about whether a subscribed-to supplementary service is activated/deactivated may be received through a network and displayed on a menu screen.

However, accurate information for use of a supplementary service and a control service method have not been provided in a conventional art.

Even though a user subscribes to a supplementary service, the user may not often change a deactivated supplementary service to an activated supplementary service due to a conflict among supplementary services, an error generated in a network/terminal, and the like. Accordingly, it may be difficult to determine whether the user actually uses a desired supplementary service just by observing the activation/deactivation state of the supplementary service. That is, in a conventional art, since the user may not be provided with information about a supplementary service that is not used even though the supplementary service is changed from deactivated to activated, an error may occur when the user requests the supplementary service to be changed to activated.

Also, in a conventional art, an appropriate service for notifying or processing an error may not be provided. Accordingly, a user may be required to make an inquiry to a communication service provider or a terminal manufacturer about a cause of an error or about a method to handle the error, or the user may need to wait for a service to become operational.

Thus, a method of providing a user with more accurate information for use of a supplementary service is desired.

SUMMARY

Exemplary embodiments of the present invention provide a method for providing a supplementary service control menu that may provide a user with state information used with a supplementary service, such as whether the user has subscribed to the supplementary service, whether the supplementary service is activated/deactivated, and whether a plurality of supplementary services is compatible with each other, using an effect of an identifier included in the supplementary service control menu. Exemplary embodiments also provide a system to provide the supplementary service control menu.

Exemplary embodiments of the present invention provide a method for providing a supplementary service control menu that may provide a predetermined procedure for handling an error based on an error value, which may be defined in a standard created by a network, a mobile terminal, or a user, when an error associated with a use of a supplementary service occurs.

Additional features of the invention will be set forth in the description which follows, and in part will be apparent from the description, or may be learned by practice of the invention.

An exemplary embodiment of the present invention discloses a system to provide a supplementary service control menu. The system includes: an information collection unit to collect state information associated with a supplementary service; a level determination unit to determine a level of the supplementary service using the collected state information; a menu building unit to generate an identifier (ID) of the supplementary service, and to build the supplementary service control menu including the generated ID; and a menu display unit to display the supplementary service control menu, including the supplementary service with an effect associated with the level, on a screen.

An exemplary embodiment of the present invention discloses a method for providing a supplementary service control menu. The method includes: collecting state information associated with a supplementary service; determining a level of the supplementary service using the collected state information; generating an ID of the supplementary service; building the supplementary service control menu; and displaying the built supplementary service control menu, including the supplementary service with an effect associated with the level, on a screen.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 4 is a diagram illustrating an example of collected state information associated with a supplementary service.

FIG. 5 is a diagram illustrating an example of determining a level of a supplementary service and an effect that distinguishes levels of supplementary services.

FIG. 10 is a flowchart illustrating an operation for processing an error, generated when a change command is generated with respect to state information of a supplementary service in a supplementary service control menu, and an operation for changing state information based on the change command when the error does not occur.

DETAILED DESCRIPTION OF THE ILLUSTRATED EMBODIMENTS

Figure 1:
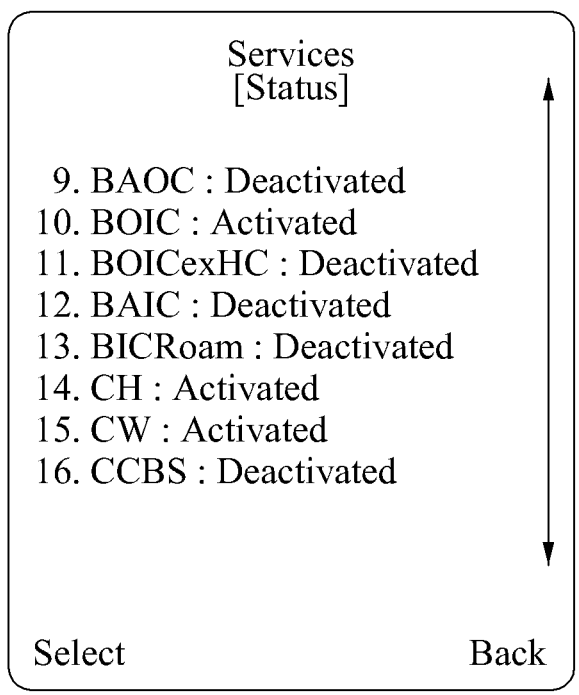
FIG. 1 is a diagram illustrating an example of a screen displaying a status of a supplementary service of a mobile terminal in a conventional art.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

The mobile terminal described with reference to the illustrated embodiments may include a computer terminal, a public switched telephone network (PSTN) terminal, a voice over Internet Protocol (VoIP) terminal, a session initiation protocol (SIP) terminal, a media gateway control (Megaco) terminal, a personal digital assistant (PDA), a mobile phone, a personal communication service (PCS) phone, a hand-held personal computer (hand-held PC), a code-division multiple access (CDMA)-2000 (1X, 3X) phone, a wideband code-division multiple access (wideband CDMA) phone, a dual band/dual mode phone, a Global System for Mobile Communication (GSM) phone, a mobile broadband system (MBS) phone, or a satellite/terrestrial digital multimedia broadcasting (DMB) phone, and the like. That is, the mobile terminal may include a general personal computer as well as a terminal that may be extended through portable terminals such as a cellular phone, a notebook computer, and a PDA.

Figure 2:
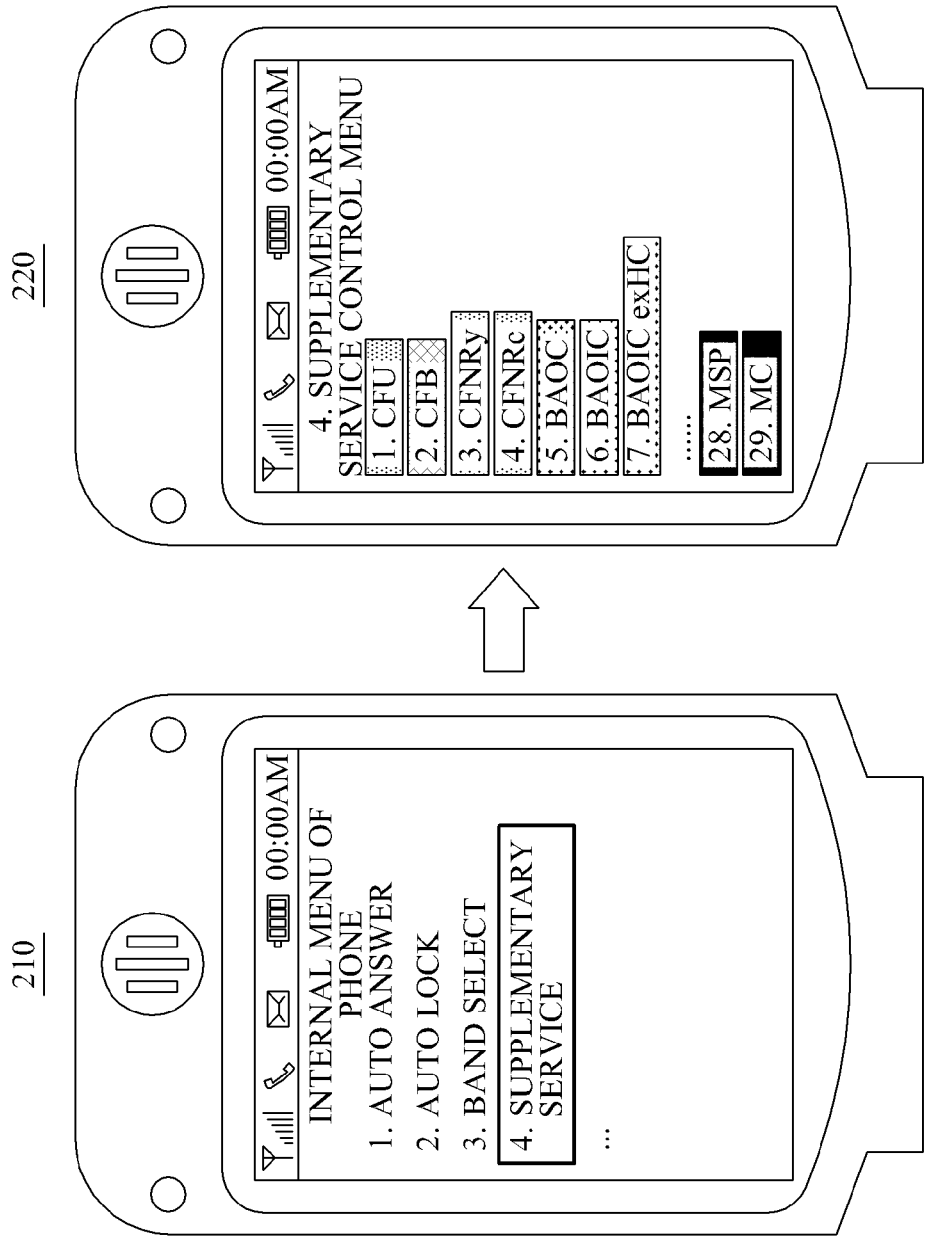
FIG. 2 is a diagram illustrating a screen providing a supplementary service control menu according to an exemplary embodiment of the present invention.

FIG. 2 is a diagram illustrating a screen providing a supplementary service control menu according to an exemplary embodiment of the present invention.

An example where an internal menu 210 of a phone changes to the supplementary service control menu 220 is illustrated in FIG. 2.

When a user selects an item of '4. supplementary service' from the internal menu 210, a command to enter the supplementary service control menu 220 may be generated.

A system that provides a supplementary service control menu, hereinafter, referred to as the system, may request and receive state information, or read the state information stored in a memory. Here, the state information may include subscription information of a supplementary service of a mobile terminal, activation information of a subscribed-to supplementary service, and compatibility information among a plurality of supplementary services.

For example, the system may receive the activation information and the subscription information of the supplementary service from a service server associated with a mobile communication service provider, and may receive the compatibility information among the plurality of supplementary services from a service server associated with a terminal manufacturer.

Also, the system may analyze the state information, determine a level of the supplementary service, generate an identifier (ID) generating an effect, build the supplementary service control menu 220 including the generated ID, and display the supplementary service control menu 220 on a screen. The effect may be predetermined for each level.

For example, the system may determine a supplementary service, which is subscribed to and activated, as a first level, and a supplementary service, which is not subscribed to, as a second level. Also, the system may determine a supplementary service, which is subscribed to, deactivated, and compatible with an activated supplementary service, as a third level, and a supplementary service, which is subscribed to, deactivated, and incompatible with an activated supplementary service, as a fourth level.

Also, the system may generate the ID by applying at least one of a font, color, italics, a thickness, an underline, and shadow, to a title of the supplementary service, or may generate an ID including an image predetermined for each level. Here, the font, color, italics, a thickness, an underline, and shadow may be determined for each level.

Referring to the supplementary service control menu 220 of FIG. 2, the system may display a Call Forwarding Busy (CFB), which is a supplementary service determined as a first level, in blue, and a Multiple Subscriber Profile (MSP), which is a supplementary service determined as a second level, in black. Also, the system may display a Call Forwarding Unconditional (CFU), a Call Forwarding on No Reply (CFNRy), and a Call Forwarding Not Reachable (CFNRc), which are supplementary services determined as a third level, in light blue. Also, the system may display a Barring of all outgoing calls (BAOC), a Barring of All Outgoing International Calls (BAOIC), and a BAOIC except to the Home Country (exHC), which are supplementary services determined as a fourth level, in gray.

Accordingly, a user may ascertain whether the supplementary service is not subscribed to yet, whether the supplementary service is subscribed to and activated at present, whether the supplementary service may be changed to be activated although subscribed to and deactivated at present, through the colors of the supplementary services included in the supplementary service control menu 220.

Figure 3:
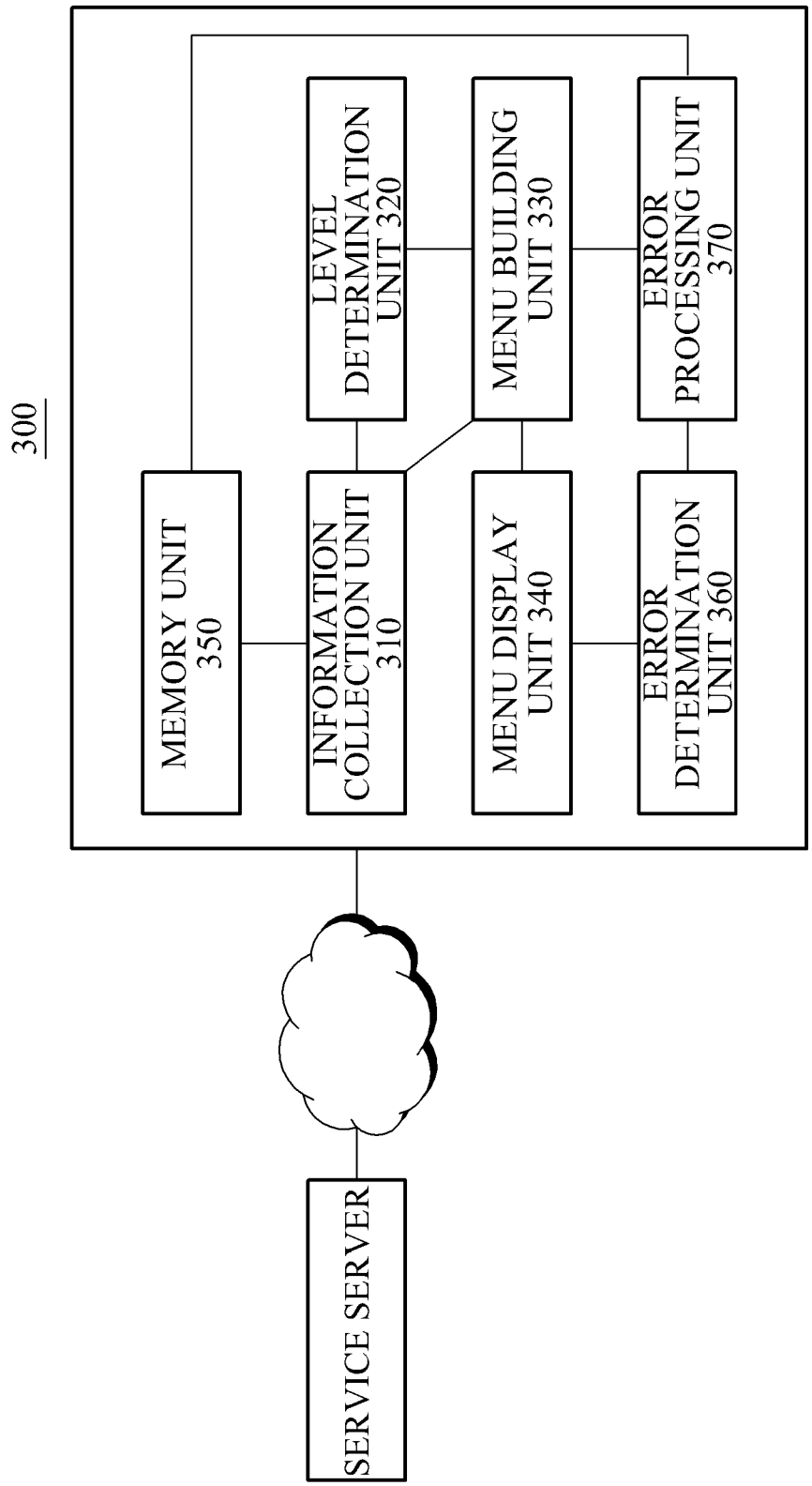
FIG. 3 is a block diagram illustrating a configuration of a system to provide a supplementary service control menu according to an exemplary embodiment of the present invention.

FIG. 3 is a block diagram illustrating a configuration of a system to provide a supplementary service control menu according to an exemplary embodiment of the present invention.

The system 300 may include an information collection unit 310, a level determination unit 320, a menu building unit 330, a menu display unit 340, a memory unit 350, an error determination unit 360, and an error processing unit 370.

The information collection unit 310 may collect state information associated with a supplementary service based on a command to enter the supplementary service control menu.

For example, the information collection unit 310 may interrogate a service server associated with the supplementary service, and collect the state information from the service server when the command is generated.

Alternatively, the information collection unit 310 may store state information, periodically downloaded from the service server, in the memory unit 350, and collect the state information in the memory unit 350 when the command is generated.

Alternatively, the information collection unit 310 may collect state information, such as compatibility information, stored in the memory unit 350 when a mobile terminal is programmed.

Hereinafter, the information collection unit 310 is described in more detail with reference to FIG. 4.

FIG. 4 is a diagram illustrating an example of collected state information associated with the supplementary service.

When a user selects the item of '4. supplementary service' from the internal menu 210 illustrated in FIG. 2, and a command to enter the supplementary service control menu 220 may be generated, the information collection unit 310 may collect state information associated with the supplementary service with respect to a mobile terminal or the user.

As illustrated in FIG. 4, the state information associated with the supplementary service may include subscription information and activation information of the supplementary service, and compatibility information among a plurality of supplementary services.

Here, the subscription information may include information about whether the user subscribes to the supplementary service.

Also, the activation information may include information about whether the supplementary service is activated/deactivated. For example, when the activation information of the supplementary service is 'activated', the supplementary service is being used by the user. When the activation information of the supplementary service is 'deactivated', the supplementary service is not currently used by the user.

Also, the compatibility information may include information about whether the plurality of supplementary services is compatible with each other based on whether a conflict among the plurality of supplementary services occurs when the plurality of supplementary services is simultaneously activated. For example, the compatibility information may include information about 'being compatible' when a conflict does not occur, and information about 'being incompatible' when a conflict occurs.

For example, a conflict may occur when a call barring is activated, when a call forwarding service to change an incoming call to another number is activated while a supplementary service 'A' is activated, and when it is desired that a deactivated supplementary service 'B' changes to be activated. In this case, compatibility information of the supplementary service 'B' may include information about being incompatible with the activated supplementary services and with the deactivated supplementary services.

For reference, the compatibility information illustrated in FIG. 4 may include information about whether a supplementary service is compatible/incompatible depending on whether a conflict exists with any one or any combination of CFU, CFNRy, CFNRc, BAOC, BAOIC, and BAOIC exHC, which are currently deactivated supplementary services, and CFB, which is a currently activated supplementary service, occurs, when the deactivated supplementary services are activated.

The error processing unit 370 may determine whether a conflict among a plurality of supplementary services occurs, and control a portion of the plurality of supplementary services to be deactivated when it is determined that a conflict occurs. Here, the plurality of supplementary services may be confirmed to be activated based on the activation information included in the state information.

The level determination unit 320 may determine a level of the supplementary service using the collected state information.

Also, the level determination unit 320 may store the determined level in the memory unit 350. The memory unit 350 may be embodied as a variety of storing media such as an Encrypting File System (EFS).

For example, the level determination unit 320 may extract the subscription information and the activation information of the supplementary service from the state information, and determine the level using the extracted subscription information and the extracted activation information.

In this instance, the level determination unit 320 may determine the level using the compatibility information included in the state information, with respect to a supplementary service that is confirmed to be deactivated based on the activation information.

That is, the level determination unit 320 may determine whether a conflict among the deactivated supplementary service and an activated supplementary service occurs, and may determine the level using a result of the determination.

Hereinafter, the level determination unit 320 is described in more detail with reference to FIG. 4 and FIG. 5.

FIG. 5 is a diagram illustrating an example of determining a level of a supplementary service and an effect that distinguishes levels of supplementary services.

The level determination unit 320 may determine a supplementary service CFB as a first level. The supplementary service CFB may be confirmed to be subscribed to based on the subscription information of the state information illustrated in FIG. 4, and confirmed to be activated based on the activation information of the state information.

Also, the level determination unit 320 may determine supplementary services MSP and MC as a second level. The supplementary services MSP and MC may be confirmed to be not subscribed to based on the subscription information.

Also, the level determination unit 320 may determine supplementary services, CFU, CFNRy, and CFNRc, as a third level. The supplementary services, CFU, CFNRy, and CFNRc, may be confirmed to be subscribed to based on the subscription information, confirmed to be deactivated based on the activation information, and compatible, that is, the compatibility information of the state information being compatible, with the activated supplementary service CFB. Also, the level determination unit 320 may determine supplementary services, BAOC, BAOIC, and BAOIC exHC, as a fourth level. The supplementary services, BAOC, BAOIC, and BAOIC exHC, may be incompatible, confirmed to be subscribed to based on the subscription information, and confirmed to be deactivated based on the activation information.

In this instance, the effect to distinguish the levels may be at least one displayed property, for example a font, color, italics, a thickness, an underline, and a shadow. Alternatively, the effect may be an image predetermined for each level.

The menu building unit 330 may generate an ID of the supplementary service, and build the supplementary service control menu including the generated ID. The ID may generate the effect to distinguish the levels. The menu display unit 340 may display the built supplementary service control menu on a screen.

For example, the menu building unit 330 cause the screen to emit a predetermined color for the determined level as the effect, or may generate the ID including an image predetermined for the level.

Here, the effect may be a property such as font, italics, a thickness, an underline, and a shadow, as well as the color and image predetermined for each level. Also, the ID may be a title or an image itself of the supplementary service generating the effect.

That is, the menu building unit 330 may generate the title where the font predetermined for each level is applied, as the ID, or generate the ID including the image predetermined for each level, to build the supplementary service control menu.

Also, the menu display unit 340 may display the built supplementary service control menu on a screen as illustrated in FIG. 2.

That is, referring to the supplementary service control menu 220 of FIG. 2, the menu display unit 340 may display the supplementary service CFB determined as the first level in blue corresponding to the first level, the supplementary services MSP and MC determined as the second level in black corresponding to the second level, the supplementary services CFU, CFNRy, and CFNRc, determined as the third level in pale blue corresponding to the third level, and the supplementary services, BAOC, BAOIC, and BAOIC exHC determined as the fourth level in gray corresponding to the fourth level.

Accordingly, a user may determine whether the supplementary service is not subscribed to, whether the supplementary service is subscribed to and currently activated, whether the supplementary service is subscribed to, currently deactivated, and changed to be activated, and whether the supplementary service is subscribed to, currently deactivated, and not changed to be activated, through the color of the supplementary service of the supplementary service control menu 220.

According to an exemplary embodiment, the state information, such as information about whether the supplementary service is subscribed to, whether the supplementary service is activated, and whether a plurality of supplementary services is compatible, may be provided to a user through the effect of the ID included in the supplementary service control menu.

The error determination unit 360 may determine whether an error occurs when a change command of the state information is generated in the supplementary service control menu displayed on the screen.

For example, when an ID having the effect of being displayed in gray, '5. BAOC', is selected by a user from the supplementary service control menu 220 illustrated in FIG. 2, a change command with respect to activation information of a supplementary service of the selected ID may be generated.

Accordingly, when activation information of the supplementary service BAOC changes to be activated based on the change command, the error determination unit 360 may determine whether an error, such as a not-subscribed-to error, a user input error, a network error, an error associated with a conflict among supplementary services, and an error associated with an unsupported network, occurs.

When it is determined that the error occurs, the error processing unit 370 may process the error according to a predetermined process associated with the type of error.

For example, the error processing unit 370 may collect a user's manual from the memory unit 350 storing a method for processing an error, or receive the user's manual from a service server to process the error.

Alternatively, when it is determined that the error does not occur, or when the error is processed, the error processing unit 370 may change the state information based on the change command.

That is, the error processing unit 370 may change the activation information of the supplementary service BAOC to be activated from deactivated.

Accordingly, a level of the supplementary service BAOC, which is stored in the memory unit 350, may be changed to a first level from a fourth level corresponding to the effect of being displayed in gray. Also, an effect of an ID of '5. BAOC' may be changed to be displayed in blue corresponding to the first level in the supplementary service control menu 220 illustrated in FIG. 2.

For example, when the change command is generated, and the error determination unit 360 determines that the user input error occurs, the error processing unit 370 may display a re-input request message on the screen according to the predetermined process associated with the error.

That is, when the user input error occurs since a password is not inputted by the user within a predetermined time period or an incorrect password is inputted, the error processing unit 370 may display a message requesting the user to re-input the password on the screen according to the predetermined process associated with the error.

Accordingly, when the password is correctly inputted by the user, the error processing unit 370 may change the activation information of the supplementary service BAOC to be activated, from being deactivated, based on the change command.

For another example, when a change command associated with state information of a supplementary service, which is not supported by a network service provider, is generated, the error determination unit 360 may determine that the error associated with the unsupported network occurs, and the error processing unit 370 may display an error message on the screen according to the predetermined process associated with the error.

For another example, when a change command associated with state information of a supplementary service, which is confirmed to be not subscribed to, is generated, the error determination unit 360 may determine that a not-subscribed-to error occurs, and the error processing unit 370 may display an error message on the screen according to the predetermined process associated with the error. When a subscription of the supplementary service is requested, the error processing unit 370 may enable the subscription of the supplementary service by connecting to a communication service provider.

Hereinafter, the error processing unit 370 is described in more detail with reference to FIG. 6.

Figure 6:
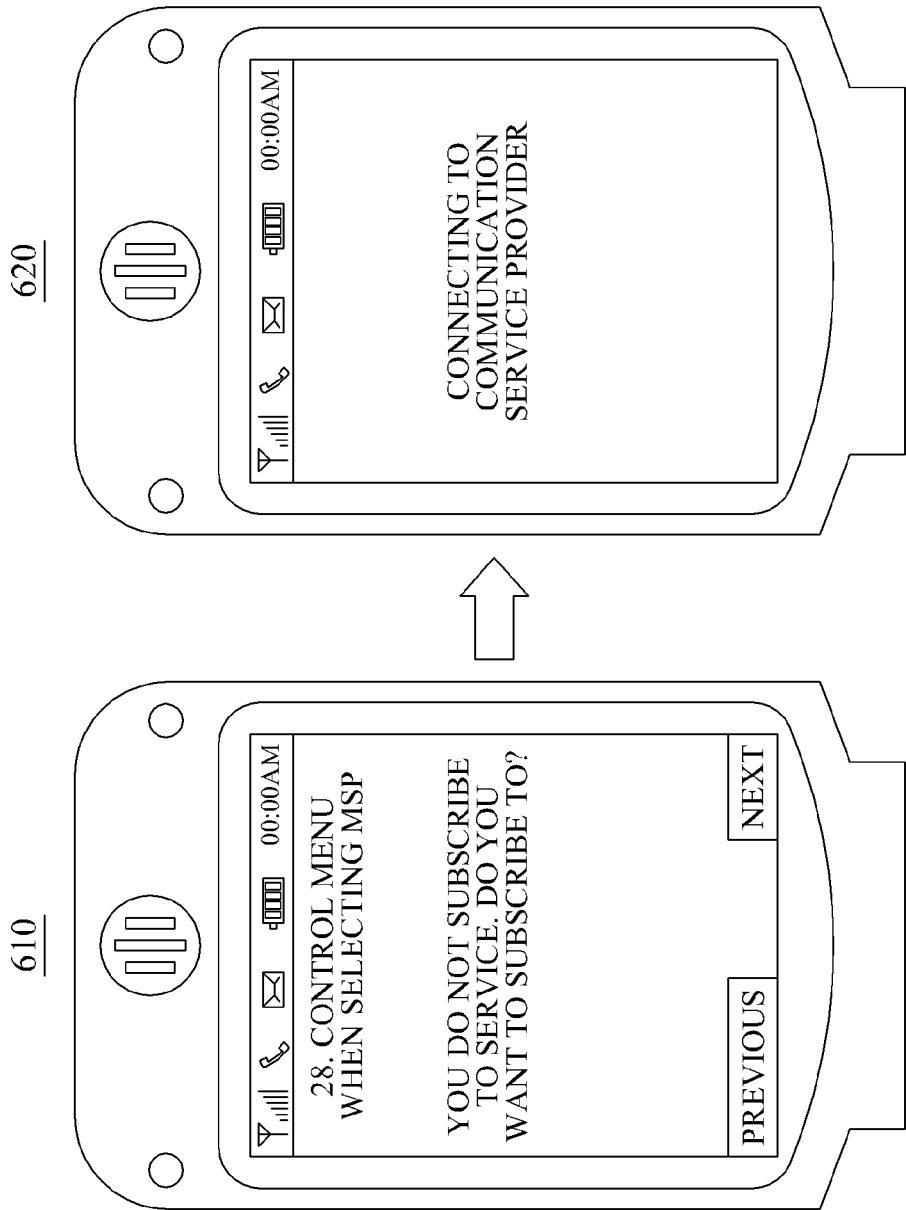
FIG. 6 is a diagram illustrating an example of processing a not-subscribed-to error.

FIG. 6 is a diagram illustrating an example of processing a not-subscribed-to error.

When an ID of '28. MSP' having the effect of being displayed in black is selected from the supplementary service control menu 220 illustrated in FIG. 2, and the change command is generated, the error determination unit 360 may determine that the not-subscribed-to error occurs.

Also, the error processing unit 370 may display an error message 610 on the screen according to the predetermined process associated with the error. When the subscription of the supplementary service MSP is requested by the user, the error processing unit 370 may connect to the communication service provider through the Internet/a phone call, and display a connection message 620.

Also, when the user is subscribed to the supplementary service MSP, the error processing unit 370 may change activation information of the supplementary service MSP to be activated.

For another example, when the error determination unit 360 may determine that the network error occurs when the change command is generated, the error processing unit 370 may reattempt the change command within a predetermined time period according to the predetermined process associated with the error, and display a result of the reattempt on the screen.

Hereinafter, the error processing unit 370 is described in more detail with reference to FIG. 7.

Figure 7:
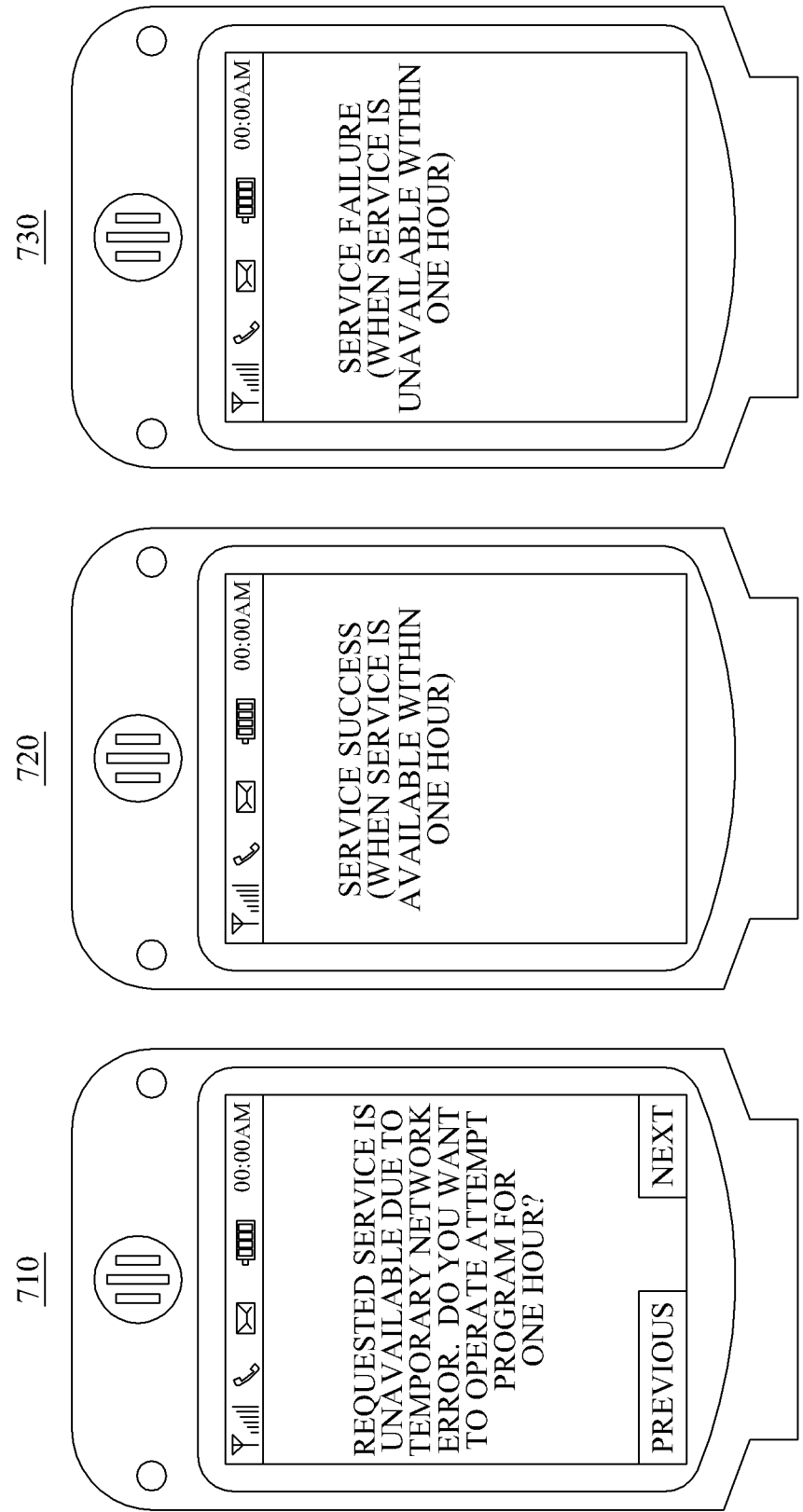
FIG. 7 is a diagram illustrating an example of processing a network error.

FIG. 7 is a diagram illustrating an example of processing a network error.

Referring to FIG. 7, the error processing unit 370 may display an error message 710 on the screen according to the predetermined process associated with the error. When a timer is operated by the user, the error processing unit 370 may automatically reattempt the change command within a predetermined time period.

Also, when the network error is processed within a predetermined time period and the reattempt is successful, the error processing unit 370 may display a message 720 associated with the reattempt success. When the reattempt fails, the error processing unit 370 may display a message 730 associated with the reattempt failure on the screen. Also, when the timer operation is canceled by the user, the error processing unit 370 may terminate the reattempt.

For another example, when the change command is associated with a change of a second supplementary service to be activated, the error determination unit 360 may determine that the error associated with a conflict between the supplementary services occurs. Here, the conflict between the second supplementary service and a first supplementary service, which is activated, occurs. The error processing unit 370 may display a message, requesting a user to select the first supplementary service or the second supplementary service, on the screen.

In this instance, when the second supplementary service is selected in the message, the error processing unit 370 may change activation information, included in state information of the first supplementary service, to be deactivated, and change activation information, included in state information of the second supplementary service, to be activated based on the change command.

Hereinafter, the error processing unit 370 is described in detail with reference to FIG. 8.

Figure 8:
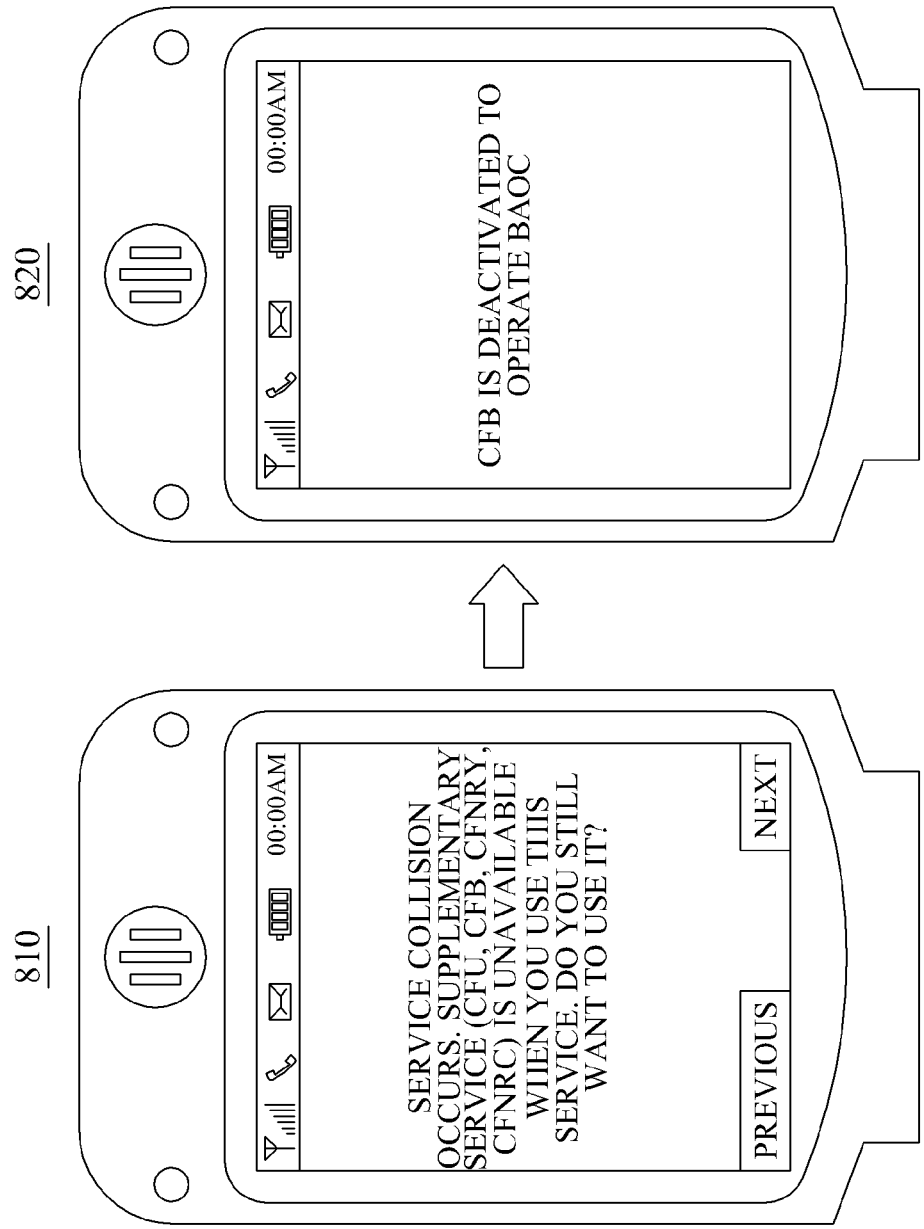
FIG. 8 is a diagram illustrating an example of processing an error associated with a conflict among supplementary services.

FIG. 8 is a diagram illustrating an example of processing the error associated with a conflict among supplementary services.

Referring to the compatibility information of the state information illustrated in FIG. 4, when a change command is generated with respect to a supplementary service CFB, which is activated, and a supplementary service BAOC, which is incompatible with activated supplementary service CFB, the error determination unit 360 may determine that the error associated with a conflict among the supplementary services occurs.

Accordingly, the error processing unit 370 may display a message 810 requesting a user to confirm whether to activate a supplementary service, on the screen according to the predetermined process associated with the error.

When a change of the currently deactivated second supplementary service BAOC to be activated is selected in the message 810, the error processing unit 370 may change the activation information of the first supplementary service CFB, which is activated at present, to be deactivated, and display a message 820 on the screen. The message 820 may be associated with the deactivation of the first supplementary service CFB.

Also, the error processing unit 370 may change the activation information of the second supplementary service BAOC to be activated based on the change command.

Accordingly, when an error associated with use of a supplementary service occurs, a predetermined process for error handling may be provided based on an error value, which may be defined in a standard generated by a network, a mobile terminal, or a user, such as a user's manual.

A method for providing a supplementary service control menu, hereinafter, referred to as the method, according to an exemplary embodiment of the present invention may be performed by the system 300. Hereinafter, for ease of description, the method illustrated in FIG. 9 and an operation of processing an error illustrated in FIG. 10 are described with reference to FIG. 3, FIG. 9, and FIG. 10.

Figure 9:
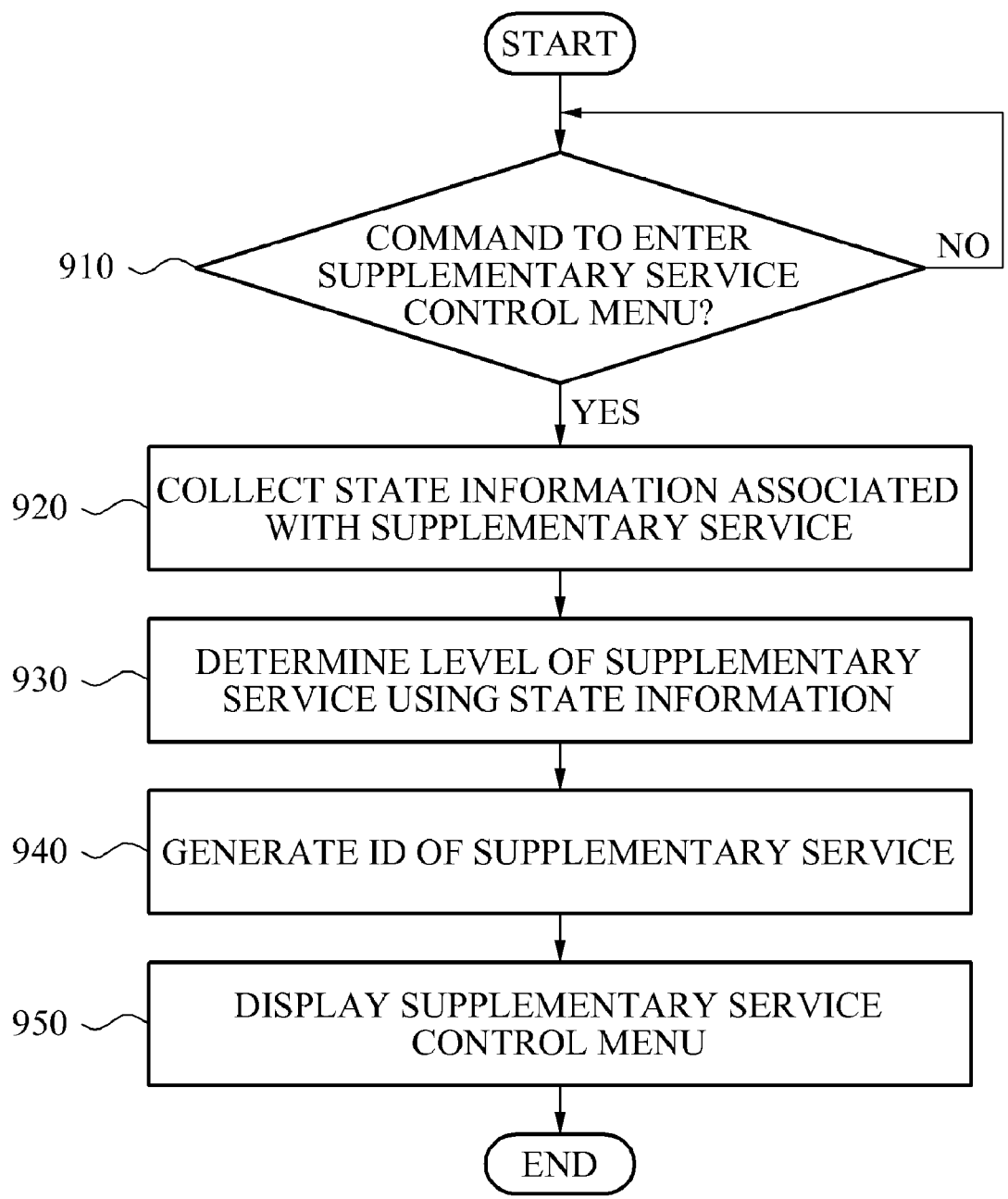
FIG. 9 is a flowchart illustrating a method for providing a supplementary service control menu according to an exemplary embodiment of the present invention.

FIG. 9 is a flowchart illustrating the method for providing a supplementary service control menu according to an exemplary embodiment of the present invention.

In operation 910, the system 300 may determine whether a command to enter a supplementary service control menu is generated.

Referring to FIG. 2, when '4. supplementary service' is selected by the user from the internal menu 210 displayed on the screen, through key or menu, the command to enter the supplementary service control menu 220 may be generated.

When the command is generated as a result of the determination in operation 910, the system 300 may collect state information associated with the supplementary service in operation 920.

For example, an information collection unit 310 may receive subscription information and activation information of the supplementary service by performing interrogation with a service server associated with a mobile communication service provider, and may receive compatibility information among a plurality of supplementary services from a service server associated with a mobile terminal manufacturer.

Alternatively, the information collection unit 310 may store the state information, periodically downloaded from the service server, in a memory unit 350. Also, the information collection unit 310 may collect the state information from the memory unit 350 when the command is generated.

Alternatively, the information collection unit 310 may collect state information such as compatibility information which is stored in the memory unit 350 when a mobile terminal is programmed.

As illustrated in FIG. 4, state information associated with a supplementary service may include subscription information of the supplementary service, activation information of the supplementary service, and compatibility information among a plurality of supplementary services.

In operation 930, the system 300 may determine a level of the supplementary service using the collected state information.

A level determination unit 320 may determine a supplementary service CFB as a first level. The supplementary service CFB may be confirmed to be subscribed to based on the subscription information of the state information illustrated in FIG. 4 and confirmed to be activated based on the activation information of the state information.

Also, the level determination unit 320 may determine supplementary services MSP and MC as a second level. The supplementary services MSP and MC may be confirmed to be not subscribed to based on the subscription information.

Also, the level determination unit 320 may determine supplementary services, CFU, CFNRy, and CFNRc, as a third level. The supplementary services, CFU, CFNRy, and CFNRc, may be confirmed to be subscribed to based on the subscription information, confirmed to be deactivated based on the activation information, and be compatible, that is, the compatibility information of the state information indicating compatibility. Also, the level determination unit 320 may determine supplementary services, BAOC, BAOIC, and BAOIC exHC, as a fourth level. The supplementary services, BAOC, BAOIC, and BAOIC exHC, may be incompatible, confirmed to be subscribed to based on the subscription information, and confirmed to be deactivated based on the activation information.

In operation 940, the system 300 may generate an ID of the supplementary service generating an effect to distinguish the levels. In operation 950, the system 300 may build the supplementary service control menu including the generated ID, and display the supplementary service control menu.

Here, the effect may be a property such as font, italics, a thickness, an underline, and a shadow, as well as a color and an image predetermined for each level. Also, the ID may be a title or an image of the supplementary service generating the effect.

That is, a menu building unit 330 may generate a title where the font property predetermined for each level is applied, as the ID, or generate the ID including the image predetermined for each level. Also, a menu display unit 340 may display the supplementary service control menu including the generated ID as illustrated in FIG. 2.

Accordingly, a user may observe whether the supplementary service is not subscribed to, whether the supplementary service is subscribed to and currently activated, whether the supplementary service is subscribed to, currently deactivated, and compatible with an activated supplementary service, and whether the supplementary service is subscribed to, currently deactivated, and not compatible with an activated supplementary service, through the color of the supplementary service of the supplementary service control menu 220.

Thus, the state information associated with the supplementary service, such as information about whether the supplementary service is subscribed to, whether the supplementary service is activated, and whether supplementary services are compatible, may be more accurately provided to the user through the effect of the ID included in the supplementary service control menu.

FIG. 10 is a flowchart illustrating an operation for processing an error, generated when a change command is generated with respect to state information of a supplementary service in a supplementary service control menu, and an operation for changing state information based on the change command when the error does not occur.

In operation 1005, the system 300 may determine whether a change command is generated with respect to the state information of the supplementary service in the supplementary service control menu displayed on the screen.

For example, when an ID having the effect of being displayed in gray, '5. BAOC', is selected by a user from the supplementary service control menu 220 illustrated in FIG. 2, a change command with respect to activation information of a supplementary service of the selected ID may be generated.

When the change command is generated based on a result of the determination in operation 1005, the system 300 may determine whether a not subscribed-to error occurs in operation 1010.

Referring to FIG. 2, when an ID of '28. MSP' having the effect of being displayed in black is selected from the supplementary service control menu 220, and the change command is generated, an error determination unit 360 may determine that the not-subscribed-to error occurs.

When the not-subscribed-to error occurs as a result of the determination in operation 1010, the system 300 may display an error message 610 on the screen according to a predetermined process associated with the error in operation 1015. When the subscription of the supplementary service MSP is requested by the user, the system 300 may connect to the communication service provider through the Internet/a phone call and display a connection message 620.

When the not-subscribed-to error does not occur as a result of the determination in operation 1010, the system 300 may determine whether a user input error occurs in operation 1020.

That is, the error determination unit 360 may determine whether the user input error occurs since a password is not inputted by the user within a predetermined time period or an incorrect password is inputted.

When the user input error occurs as a result of the determination in operation 1020, the system 300 may display a message requesting the user to re-input the password on the screen according to a predetermined process associated with the error in operation 1025.

When the user input error does not occur as a result of the determination in operation 1020, the system 300 may determine whether a network error occurs in operation 1030.

When the network error occurs as a result of the determination in operation 1030, the system 300 may reattempt the change command within a predetermined time period, and display a result of the reattempt on the screen in operation 1035.

That is, an error processing unit 370 may display an error message 710 on the screen according to the predetermined process associated with the error. When a timer is operated by the user, the error processing unit 370 may automatically reattempt the change command within a predetermined time period.

Also, when the network error is processed within a predetermined time period and the reattempt is successful, the error processing unit 370 may display a message 720 associated with the reattempt success. When the reattempt fails, the error processing unit 370 may display a message 730 associated with the reattempt failure on the screen. Also, when the timer operation is canceled by the user, the error processing unit 370 may terminate the reattempt.

When the network error does not occur as a result of the determination in operation 1030, the system 300 may determine an error associated with a conflict among supplementary services occurs in operation 1040.

That is, when a change command is generated with respect to a supplementary service BAOC which is deactivated and incompatible, the error determination unit 360 may determine that the error associated with a conflict among supplementary services occurs.

When the error associated with a conflict among supplementary services occurs as a result of the determination in operation 1040, the system 300 may display a message 810, requesting a user to select a supplementary service to be activated, on the screen according to the predetermined process associated with the error in operation 1045.

When a change to the second supplementary service BAOC, which is deactivated at present, is selected in the message 810, the error processing unit 370 may change the activation information of the first supplementary service CFB, which is activated at present, to be deactivated. Also, a message 820, associated with the deactivation of the first supplementary service CFB, may be displayed on the screen.

When the error associated with a conflict among supplementary services does not occur as a result of the determination in operation 1040, the system 300 may determine whether an error associated with the unsupported network occurs in operation 1050.

That is, when a change command associated with state information of a supplementary service, which is not supported by a network service provider, is generated, the error determination unit 360 may determine that the error associated with the unsupported network occurs.

When the error associated with the unsupported network occurs as a result of the determination in operation 1050, the system 300 may display an error message on the screen according to a predetermined process associated with the error in operation 1055.

When the error associated with the unsupported network does not occur as a result of the determination in operation 1050, or when the error is completely processed, the system 300 may change the state information of the supplementary service based on the change command in operation 1060.

That is, the error processing unit 370 may change activation information of the supplementary service BAOC to be activated based on the change command.

Accordingly, a level of the supplementary service BAOC, which is stored in the memory unit 350, may be changed to a first level from a fourth level corresponding to the effect of being displayed in gray. Also, an effect of an ID of '5. BAOC' may be changed to be displayed blue corresponding to the first level, in the supplementary service control menu 220 illustrated in FIG. 2.

According to an exemplary embodiment, when an error associated with use of a supplementary service occurs, a user's manual for an error handling may be provided based on an error value, which is defined in a standard generated by a network, a mobile terminal, or a user.

According to an exemplary embodiment, even when a supplementary service specification is changed or extended in a next generation standard in the future, information for use of supplementary services may be provided to a user through a supplementary service control menu, when state information, such as compatibility information among a plurality of supplementary services stored in a mobile terminal, is upgraded using a Firmware Over-The-Air (FOTA) service, and the like.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for controlling a service control menu in a terminal, comprising:
   determining an effect of a service according to state information of the service;
   displaying the service control menu including an identifier of the service with the effect of the service on a screen;
   determining whether an error occurs if a change command of the state information is generated via the displayed service control menu; and
   if the error occurs, processing the error according to a predetermined process associated with the error, and if the error does not occur, changing the state information based on the change command.

2. The method of claim 1, wherein the state information comprises at least one of subscription information, activation information, and compatibility information.

3. The method of claim 1, wherein the error occurs if a conflict occurs among a plurality of activated services in the terminal.

4. The method of claim 3, wherein the processing of the error according to the predetermined process comprises deactivating at least one of the plurality of activated services in the terminal.

5. The method of claim 1, wherein the error occurs if the change command is associated with a change of a second service to be activated, and the second service conflicts with a first service which is activated in the terminal.

6. The method of claim 5, wherein the processing of the error according to the predetermined process comprises displaying a message on the screen, the message requesting a selection of the first service or the second service.

7. The method of claim 6, further comprising:
   changing activation information of the state information of the first service to be deactivated, and changing activation information of the state information of the second service to be activated.

8. The method of claim 7, further comprising:
   determining a new effect of the second service based on the state information of the second service; and
   displaying the service control menu including an identifier of the second service with the new effect of the second service on the screen.

9. The method of claim 1, wherein
   the error occurs if the change command is generated with respect to the state information of a supplementary service not subscribed to, and the processing of the error according to the predetermined process includes displaying a message on the screen according to the predetermined process associated with the error, and connecting to a communication service provider of the service if a subscription of the service is selected.

10. The method of claim 1, wherein the processing of the error according to the predetermined process comprises reattempting the change command within a predetermined time period according to the predetermined process associated with the error, and displaying a result of the reattempt on the screen if the error is corresponding to a network.

11. The method of claim 1, wherein the effect is at least one of a font, an italics style, a thickness, an underline style, a shadow style, a color, and an image.

12. A terminal to provide a service control menu, comprising:
- an information collection unit to collect state information associated with a service;
- a menu building unit to determine an effect of the service according to the state information, to generate an identifier (ID) of the service according to the state information, and to build a service control menu including the effect;
- a menu display unit to display the service control menu, including the service with the effect, on a screen; and
- an error processing unit to determine whether an error occurs if a change command of the state information is generated via the service control menu and, if the error occurs, processing the error according to a predetermined process associated with the error, and if the error does not occur, changing the state information based on the change command.

13. The terminal of claim 12, wherein the state information comprises at least one of subscription information, activation information, and compatibility information.

14. The terminal of claim 12, wherein the error occurs if a conflict occurs among the plurality of activated services in the terminal.

15. The terminal of claim 14, wherein the error processing unit processes the error according to the predetermined process by deactivating at least one of the plurality of activated services.

16. The terminal of claim 12, wherein the error occurs if the change command is associated with a change of a second service to be activated, and the second service conflicts with a first service which is activated in the terminal.

17. The terminal of claim 16, wherein the error processing unit processes the error according to the predetermined process by displaying a message on the screen, the message requesting a selection of the first service or the second service.

18. The terminal of claim 17, wherein the error processing unit changes activation information of the state information of the first service to be deactivated, and changes activation information of the state information of the second service to be activated.

19. The terminal of claim 18, wherein the menu building unit determines a new effect of the second service based on the state information of the second service; and the menu display unit displays the service control menu including an identifier of the second service with the new effect of the second service on the screen.

20. The terminal of claim 12, wherein the error occurs if the change command is generated with respect to the state information of a service not subscribed to, and the error processing unit processes the error according to the predetermined process by causing the menu display unit to display a message on the screen according to the predetermined process associated with the error, and the error processing unit connects to a communication service provider of the service if a subscription of the service is selected.

21. The terminal of claim 12, wherein the error processing unit processes the error according to the predetermined process by reattempting the change command within a predetermined time period according to the predetermined process associated with the error, and the menu display unit displays a result of the reattempt on the screen if the error is corresponding to a network.

22. The terminal of claim 12, wherein the effect is at least one of a font, an italics style, a thickness, an underline style, a shadow style, a color, and an image.

* * * * *